United States Patent
Zolotow et al.

(10) Patent No.: US 11,347,822 B2
(45) Date of Patent: May 31, 2022

(54) QUERY PROCESSING TO RETRIEVE CREDIBLE SEARCH RESULTS

(71) Applicant: International Business Machines Corporation, Armonk, NY (US)

(72) Inventors: Clea Anne Zolotow, Key West, FL (US); James Taggart, Mounds, OK (US); Tedrick N. Northway, High Springs, FL (US); Arvid Van Essche, Kortrijk-Dutsel (BE); Nikhilkumar V. Shah, Bear, DE (US); Leszek Adamiak, Miami Beach, FL (US)

(73) Assignee: International Business Machines corporation, Armonk, NY (US)

( * ) Notice: Subject to any disclaimer, the term of this patent is extended or adjusted under 35 U.S.C. 154(b) by 2 days.

(21) Appl. No.: 16/856,595

(22) Filed: Apr. 23, 2020

(65) Prior Publication Data

US 2021/0334328 A1 Oct. 28, 2021

(51) Int. Cl.
| | | |
|---|---|---|
| *G06F 16/2457* | (2019.01) | |
| *G06F 16/9538* | (2019.01) | |
| *G06F 16/9032* | (2019.01) | |
| *G06F 16/9536* | (2019.01) | |

(52) U.S. Cl.
CPC .... *G06F 16/9538* (2019.01); *G06F 16/24578* (2019.01); *G06F 16/90332* (2019.01); *G06F 16/9536* (2019.01)

(58) Field of Classification Search
CPC .......... G06F 16/90332; G06F 16/9536; G06F 16/9538; G06F 16/24578; G06F 16/25; G06F 16/313

See application file for complete search history.

(56) References Cited

U.S. PATENT DOCUMENTS

| | | |
|---|---|---|
| 9,483,582 B2 | 11/2016 | Gaucher et al. |
| 9,536,266 B2 | 1/2017 | Ploesser et al. |
| 9,886,471 B2 | 2/2018 | Myslinski |
| 10,157,198 B2 | 12/2018 | Cheng et al. |
| 10,169,424 B2 | 1/2019 | Motte et al. |

(Continued)

FOREIGN PATENT DOCUMENTS

CN 109492076 A 3/2019

*Primary Examiner* — Robert W Beausoliel, Jr.
*Assistant Examiner* — Nirav K Khakhar
(74) *Attorney, Agent, or Firm* — Edell Shapiro & Finnan, LLC (57) ABSTRACT

A computer system processes a query to retrieve credible search results. One or more data sources are searched to retrieve search results pertaining to the query. Analytics are performed on the search results to produce a score for the search results, wherein the score indicates credible information within the search results and the analytics include one or more from a group of natural language processing and emotion analytics. In response to the score indicating a lack of credible information within the search results, the search results are analyzed to determine a consensus within the search results, wherein the consensus indicates credible information within the search results. The credible information of the search results is presented. Embodiments of the present invention further include a method and program product for processing a query to retrieve credible search results in substantially the same manner described above.

20 Claims, 5 Drawing Sheets

(56) References Cited

U.S. PATENT DOCUMENTS

| | | |
|---|---|---|
| 10,223,424 B2 | 3/2019 | Bahl et al. |
| 2015/0310687 A1* | 10/2015 | Morgia ................ G06Q 30/02 |
| | | 705/12 |
| 2016/0224666 A1* | 8/2016 | Horvitz ................ G06F 16/951 |
| 2019/0220544 A1 | 7/2019 | Khanna |
| 2020/0092588 A1* | 3/2020 | Manoria .......... H04N 21/26208 |
| 2020/0202071 A1* | 6/2020 | Ghulati ................ G06F 40/216 |
| 2021/0019339 A1* | 1/2021 | Ghulati ................ G06Q 50/00 |
| 2021/0089579 A1* | 3/2021 | Shu ........................ H04L 51/32 |
| 2021/0103626 A1* | 4/2021 | Jolly .................... G06F 16/345 |

* cited by examiner

QUERY PROCESSING TO RETRIEVE CREDIBLE SEARCH RESULTS

BACKGROUND

1. Technical Field

Present invention embodiments relate to query processing, and more specifically, to processing a query to retrieve credible search results for presentation to a user.

2. Discussion of the Related Art

Consumers who search online sources for news and other information may often be presented with incorrect or biased results. Publications might include outright fabrications, and opinions can be intentionally misrepresented as objective statements of fact. Moreover, consumers who frequent the same online sources might rarely be presented with findings that challenge or contradict their currently-held beliefs. Distinguishing fact from fiction can be especially difficult when there is a wealth of conflicting data on a subject.

SUMMARY

According to one embodiment of the present invention, a computer system processes a query to retrieve credible search results. One or more data sources are searched to retrieve search results pertaining to the query. Analytics are performed on the search results to produce a score for the search results, wherein the score indicates credible information within the search results and the analytics include one or more from a group of natural language processing and emotion analytics. In response to the score indicating a lack of credible information within the search results, the search results are analyzed to determine a consensus within the search results, wherein the consensus indicates credible information within the search results. The credible information of the search results is presented. Embodiments of the present invention further include a method and program product for processing a query to retrieve credible search results in substantially the same manner described above.

BRIEF DESCRIPTION OF THE DRAWINGS

Generally, like reference numerals in the various figures are utilized to designate like components.

DETAILED DESCRIPTION

Present invention embodiments relate to query processing, and more specifically, to processing a query to retrieve credible search results for presentation to a user. When a user searches one or more online resources for information about a topic of interest, there is no guarantee that the results contain accurate information. Rather, while conventional search services return results that are relevant to the user's query, the results are not analyzed to determine whether the content is accurate and presented objectively. Thus, a user researching a topic may inadvertently rely on a misleading or incorrect reporting of the topic. For example, a user may erroneously believe a fictitious accounting of a historical event, or a user may be influenced by dishonest reviews to purchase an undesired product.

In contrast, present invention embodiments perform query processing to obtain results, and perform analytics on the results in order to ensure that only accurate results are presented to the user. In particular, multiple sources that discuss a queried subject are collected and analyzed using techniques such as natural language processing and emotion analytics to determine a score for each result representing the credibility of the result. Thus, present invention embodiments omit any results whose scores indicate a lack of credible information, thereby presenting a user with credible results that are relevant to the user's query. Moreover, when the returned search results do not include any results that are scored as credible, present invention embodiments may additionally perform a consensus analysis on the results to nevertheless identify relevant credible information, including a most accurate majority opinion and a most accurate minority opinion.

Thus, present invention embodiments provide improved query processing that automatically filters out results that are biased and/or lacking in truthfulness prior to presenting the results to a user, thereby freeing up a user's time by enabling the user to focus only on data that satisfies a credibility threshold. Results of queries that were previously processed may be indexed so that better sources of information can be continuously identified for future queries, thus improving the accuracy of returned results over time and as queries are processed. Moreover, present invention embodiments continuously analyze and index previously-identified sources, and discover new sources, to improve the index by reevaluating the credibility of indexed results in response to new information becoming available that overturns or supports previous results. Thus, present invention embodiments improve query processing by providing an evolving index that reduces the amount of computational resources (e.g., processing, memory, and storage resources) required to process queries by excluding from the index any data sources associated with a lack of credible information. Moreover, present invention embodiments reduce network resource utilization by decreasing the size of results sets that are presented to a user, since any results that lack credible information can be identified and omitted from the results set prior to presentation to a user.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
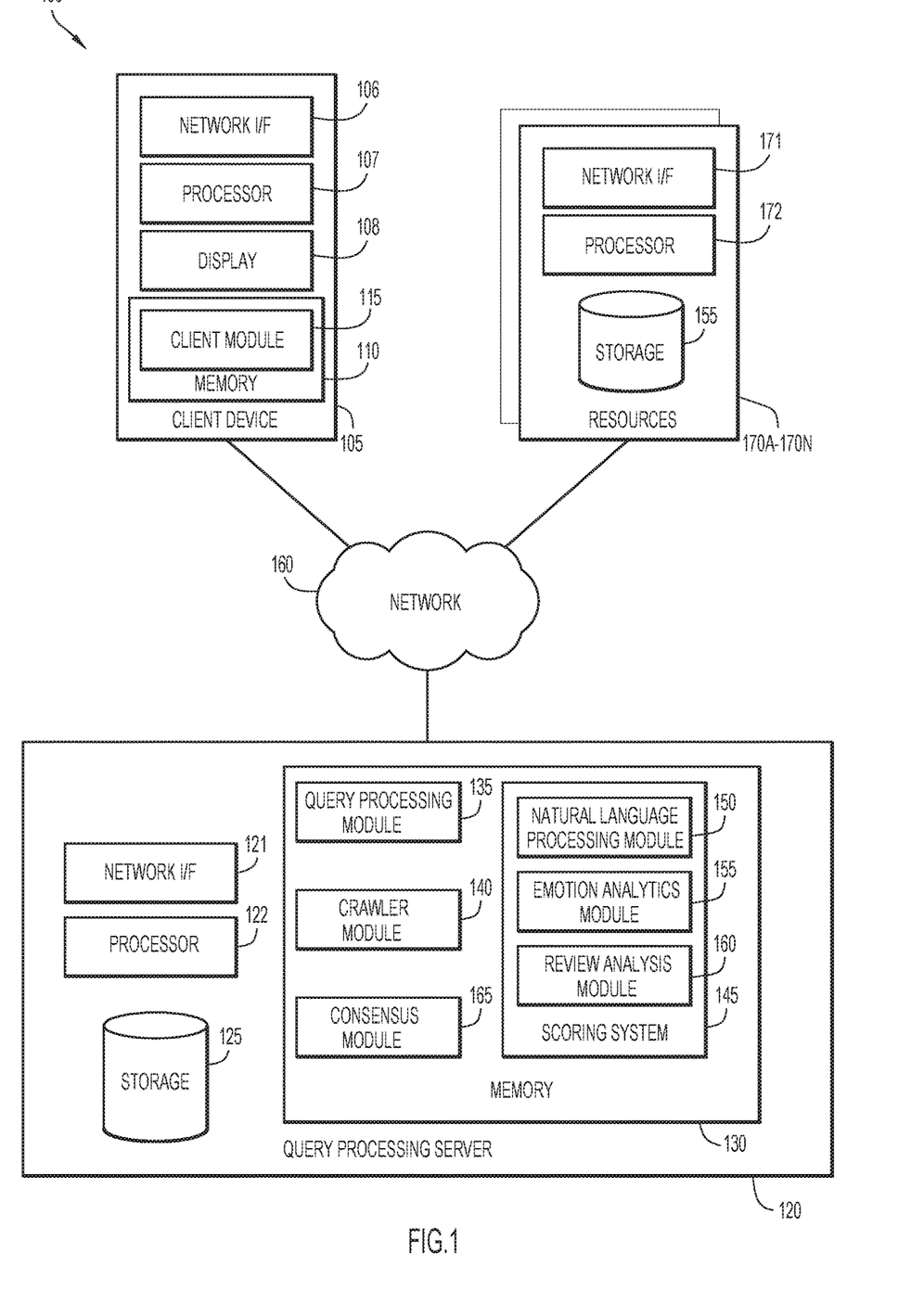
FIG. 1 is a block diagram depicting a computing environment for query processing in accordance with an embodiment of the present invention.

Present invention embodiments will now be described in detail with reference to the Figures. FIG. 1 is a block diagram depicting a computing environment 100 for query processing in accordance with an embodiment of the present invention. As depicted, computing environment 100 includes a client device 105, a query processing server 120, one or more resources 170A-170N, and a network 180. It is to be understood that the functional division among components of computing environment 100 have been chosen for purposes of explaining present invention embodiments and is not to be construed as a limiting example.

Client device 105 includes a network interface (I/F) 106, at least one processor 107, a display 108, and memory 110 that includes a client module 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 180. In general, a user of client device 105 may submit queries to query processing server 120 in order to obtain desired data, and may review search results relating to submitted queries. Client device 105 may include internal and external hardware components, as depicted and described in further detail with respect to FIG. 5.

Display 108 may include any electronic visual display or screen capable of presenting information in a visual form. For example, display 108 may be a liquid crystal display (LCD), a cathode ray tube (CRT) display, a light-emitting diode (LED) display, an electronic ink display, and the like. Display 108 may present a graphical user interface to a user of client device 105 to present search results relating to a user's query. Additionally, information describing how the search results were selected, how consensus for the results was reached, and the like, may be presented via display 108.

Client module 115 may include one or more modules or units to perform various functions of present invention embodiments described below. Client module 115 may be implemented by any combination of any quantity of software and/or hardware modules or units, and may reside within memory 110 of client device 105 for execution by a processor, such as processor 107.

Client module 115 enables a user of user device 105 to input and submit queries to query processing server 120 and to review the search results of submitted queries. A query can include any user input, such as a word, phrase, or string, about which the user desires to receive information. For example, a user's query may include a name of a product, a business, a current or historical event, a question, and the like. Queries may relate to a function of a subject (e.g., "does product X perform task Y?") or a quality of a subject (e.g., "who makes the best Z?"). In some embodiments, client module 115 is executed in a software application, such as a web browser, of client device 105.

When a user submits a query, client module 115 transmits the query to query processing server 120, which processes the query in accordance with present invention embodiments and returns a set of search results back to client module 115 for presentation to the user. A user may review and interact with search results, which are presented via display 108. In some embodiments, client module 115 also presents to a user an audit trail of information that explains why the particular search results were returned and the credibility of each source of information. When there is no clear consensus among the search results for a particular query, any majority and/or minority outcomes for the query may be returned.

Query processing server 120 includes a network interface (I/F) 121, at least one processor 122, storage 125, and memory 130. Memory 130 includes a query processing module 135, a crawler module 140, a scoring system 145, and a consensus module 165. The scoring system 145 includes a natural language processing module 150, an emotion analytics module 155, and a review analysis module 160. Query processing server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of query processing server 120 to send and receive data over a network, such as network 180. In general, query processing server 120 processes received queries to identify search results that address the query and that include credible information. Query processing server 120 may include internal and external hardware components, as depicted and described in further detail with respect to FIG. 5.

Storage 125 may include any non-volatile storage media known in the art. For example, storage 125 can be implemented with a tape library, optical library, one or more independent hard disk drives, or multiple hard disk drives in a redundant array of independent disks (RAID). Similarly, data in storage 125 may conform to any suitable storage architecture known in the art, such as a file, a relational database, an object-oriented database, and/or one or more tables. Storage 125 may store an index of queries mapped to search results, along with the scores for each search result. Additionally, storage 125 may store a network location of each search result and/or may include a local copy of the data of a search result.

Query processing module 135, crawler module 140, scoring system 145 (including natural language processing module 150, emotion analytics module 155, and review analysis module 160), and consensus module 165 may include one or more modules or units to perform various functions of present invention embodiments described below. Query processing module 135, crawler module 140, scoring system 145 (including natural language processing module 150, emotion analytics module 155, and review analysis module 160), and consensus module 165 may be implemented by any combination of any quantity of software and/or hardware modules or units, and may reside within memory 130 of query processing server 120 for execution by a processor, such as processor 122.

Query processing module 135 processes queries received by query processing server 120. Query processing module 135 may analyze a query against an index of credible information to determine whether search results corresponding to the query are indexed and available. In general, the index includes a mapping of queries to search results that have been obtained by crawler module 140 and scored by scoring system 145 in accordance with present invention embodiments. The index may be populated with search results that have been determined to contain credible information. Each search result is mapped to the query that produced the search result, and in some cases, different queries may be mapped to a same search result.

When query processing module 135 determines the index contains search results for a received query, the results may be presented to a user. The search results may be transmitted to client device 105 for review by a user. Search results may include data obtained from resources and/or search results may be presented as a list of one or more network-accessible locations (e.g., hyperlinks) that include the data.

When query processing module 135 determines that results for a received query are not indexed, query processing module 135 instructs crawler module 140 to search one or more external resources to identify search results for the query. The search results returned by crawler module 140 are analyzed by scoring system 145 to identify one or more results that contain credible information, and then query processing module 135 presents the results containing credible information to a user of client device 105. In the event that none of the results returned by crawler module 140 contain credible information for a given query, query processing module 135 instructs consensus module 165 to analyze the various outcomes among the results to determine a consensus among the results, and query processing module 135 may present the determined consensus to client device 105.

Crawler module 140 searches network-accessible resources, such as resources 170A-170N, to identify any content that relates to a received query. Resources may include search engines, trade journals, academic journals, news websites, wikis, blogs, review websites, social media platforms, and any other network-accessible sources of information. Crawler module 140 may maintain a list of discovered resources, which can include names and locations of the resources (e.g., uniform resource identifiers (URIs), uniform resource locators (URLs), Internet Protocol (IP) addresses, etc.). As crawler module 140 searches resources, new resources may be discovered and added to the list of discovered resources. For example, crawler module 140 may submit a received query to a search engine to discover new resources, or a web page relating to the query may include hyperlinks to other web pages. Crawler module 140 may search resources to identify any data that relates to a query using any conventional or other search techniques, such as lexical searching and semantic searching. Resource data identified by crawler module 140 as relating to a query may be provided to scoring system 145 to be analyzed for credibility.

In some embodiments, crawler module 140 searches network-accessible resources according to a predetermined schedule in order to identify better results for queries. Crawler module 140 may use the indexed queries as input to search resources for data that can potentially be used to update the indexed results for each query. Thus, crawler module 140 may not initiate a search in response to an index lacking search results for a received query, but may instead search resources periodically to determine whether new information has become available. Additionally or alternatively, crawler module 140 may search a resource in response to an indication that the resource has been updated. In some embodiments, crawler module 140 initiates searches for data using queries that are based on current trends or events. In particular, current search trends can be obtained from search engines, and noteworthy current events can be obtained from news websites. Thus, crawler module 140 may preemptively identify subjects that are likely to be queried, and the index can be updated in anticipation of query processing server 120 receiving queries related to the identified subject. During the process of searching resources for new data, crawler module 140 may also discover new resources, which can be added to the list of discovered resources.

Scoring system 145 scores search results obtained by crawler 140 to quantify the degree to which search results include credible information. Scoring system 145 includes natural language processing module 150, emotion analytics module 155, and review analysis module 160; one or more of the modules of scoring system 145 may be employed to determine a score for a given search result. In some embodiments, scoring system 145 generates an overall score for a search result by summing, averaging, or otherwise combining sub-scores computed by natural language module 150, emotion analytics module 155, and/or review analysis module 160.

Natural language processing module 150 may analyze search results to identify any features that indicate the presence or lack of credible information in the search results. Natural language processing module 150 may employ machine learning techniques to identify features in search results that are associated with a presence of credible information and features that are associated with a lack of credible information. In some embodiments, natural language processing module 150 is trained using a training set of data (e.g., publications, articles, reviews, etc.) that includes examples labeled as including credible information and examples that are labeled as not including credible information. Feature selection can be performed to identify a subset of features that are most relevant in classifying examples as including credible information or not including credible information, and the subset of features for the training set can be used to train a classification model. In some embodiments, user feedback may be collected to improve the accuracy of trained models. For example, a training set of data can be assembled using examples that are labeled according to user feedback regarding the credibility of results.

By way of example, relevant features for identifying the presence of credible information may include the URL of a result, the publisher or host of a result, the identity of the author of a result, the publication date of a result, the presence or absence of certain words or phrases in a result, numerical values, such as probability values (p-values), that satisfy certain threshold values, the presence of statements of fact versus statements of opinion, the presence of passive voice versus active voice, and the like. Thus, a classification model can be developed to process a search result to determine a score indicating the probability that the search result contains credible information.

Emotion analytics module 155 may analyze search results to identify any emotions or tones in search results that are indicative of a given result including credible information. Emotional analytics module 155 may utilize linguistic analysis to detect, for example, joyful, fearful, sad, angry, analytical, confident and/or tentative tones. Various tones may be classified as either positive or negative, and a rules-based scoring system can indicate predetermined point values for each tone that are used to generate a score for a search result based on the presence, strength, and prevalence of each tone in the search result. In some embodiments, emotion analytics module 155 uses emotion analysis to identify the statements of fact and statements of opinion that are processed by the classification model of natural language processing module 150.

Review analysis module 160 may analyze search results that include user reviews of a product, service, business. Thus, scoring system 145 may employ review analysis module 160 when a query relates to a subject for which reviews can be obtained. In general, review analysis module 160 may generate a score for a search result based on user ratings. In some embodiments, review analysis module 160 applies weights to reviews based on factors such as the date of the review, whether the review is authored by a verified customer, the review count and frequency for the reviewer, whether the review is made by a new user, and any other factors that can indicate fake reviews. Thus, weights are applied to increase the influence of legitimate ratings and to decrease the influence of suspicious reviews. In some embodiments, reviews that are deemed to satisfy a threshold level of suspiciousness are omitted entirely. Review analysis module 160 may then compute a review score by computing a weighted average of user ratings for the reviews that are considered. In generating a score, review analysis module 160 may analyze reviews from one or more sources, and if different sources use different rating scales, the ratings may be normalized prior to analysis.

Scoring system 145 generates an overall score for each search result by averaging, adding, or otherwise combining the individual scores generated by natural language processing module 150, emotion analytics module 155, and/or review analysis module 160. The individual scores may be normalized prior to being combined. For example, if natural language processing module 150 outputs score that range from zero to 1.0, and both emotion analytics module 155 and review analysis module 160 output scores that range from zero to ten, a natural language processing score of 0.5 might be converted to 5.0 before being summed with an emotion score of 6.0 and a review score of 7.3 to result in a combined score of 18.3. When scoring system 145 determines that a score for a search result satisfies a predetermined threshold level, the search result may be deemed to contain credible information, and may be added to the index of search results for the query associated with the search result.

Consensus module 165 may identify a consensus among search results when none of the search results for a query contain credible information. In particular, when none of the search results have scores that satisfy the predetermined threshold, consensus module 165 may identify a consensus among a majority of the search results for a particular outcome of the query. Alternatively, search results might include two or more contradictory results that are determined to contain credible information; thus, the contradictory results must be compared to identify a consensus.

First, each search result for a query may be assigned to a particular outcome. Some queries have binary outcomes, such as yes/no or true/false, and thus have two possible outcomes for a given search result. Other queries may be open-ended and may thus have multiple outcomes. For example, a query such as "youngest professional athlete" might have three or more different outcomes. Consensus module 165 may identify outcomes by processing search results using natural language processing to identify subsets of results that arrive at same or similar conclusions. In particular, consensus module 165 may analyze any statements of fact asserted in search results to determine how many different outcomes exist. Consensus module 165 may assign to a same outcome any search results that include semantically similar statements of fact.

Consensus module 165 may compare and rank the various outcomes of a query by performing a weighting of the data for each outcome. In particular, the sources of the search results for each outcome can be weighted based on the source's trustworthiness. For example, a search result from a newly-discovered source might weakly influence an outcome's rank, whereas a search result from an older source might more strongly influence an outcome's rank. Consensus module 165 may determine the trustworthiness of a source based on the scores of search results obtained from that source for a present query and/or past queries. For example, if prior search results from a given source are frequently determined to contain credible information, then a current search result associated with the same source might receive a stronger weight. Additionally or alternatively, consensus module 165 may weight newer search results more strongly than older search results. For example, newer news articles or scientific publications might be weighted more heavily than older news articles or scientific publications, as the newer content may reflect a better understanding of a topic.

Consensus module 165 may then rank outcomes by applying weights to the scores of each search results that were previously determined by scoring system 145, and combining the weighted scores for each search result supporting a particular outcome to obtain an overall outcome score for each outcome. The outcomes are then ranked based on their overall outcome scores. Thus, an outcome will be ranked more highly when the search results supporting that outcome are scored as more credible by scoring system 145, especially when the more-credible search results are weighted more heavily by consensus module 165. In some embodiments, consensus module 165 performs deduplication operations for each outcome to remove multiple search results that are similar to each other and have similar scores. Thus, consensus module 165 will not rank a particular outcome more highly simply because a same article was republished multiple times and/or published in multiple sources.

Based on the ranking of outcomes, consensus module 165 may identify the top-ranked outcome as a most accurate majority outcome. Moreover, the outcome ranked next may be identified as the most accurate minority outcome. These results can be provided to query processing module 135 for presentation to a user of client device 105.

Resources 170A-170N may each include a network interface (I/F) 171, at least one processor 172, and storage 175. In various embodiments, each resource 170A-170N may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 171 enables components of resources 170A-170N to send and receive data over a network, such as network 180. In general, resources 170A-170N may include any repositories of information, such as trade journals, academic journals, news websites, wikis, blogs, review, social media platforms, and other publications. Resources 170A-170N may include internal and external hardware components, as depicted and described in further detail with respect to FIG. 5.

Storage 175 may include any non-volatile storage media known in the art. For example, storage 175 can be implemented with a tape library, optical library, one or more independent hard disk drives, or multiple hard disk drives in a redundant array of independent disks (RAID). Similarly, data in storage 125 may conform to any suitable storage architecture known in the art, such as a file, a relational database, an object-oriented database, and/or one or more tables. Storage 175 may include any network-accessible information. Data in storage 175 may be identified by crawler module 140 and/or other search engines as relevant to a query, and the data may be indexed in accordance with present invention embodiments.

Network 180 may include a local area network (LAN), a wide area network (WAN) such as the Internet, or a combination of the two, and includes wired, wireless, or fiber optic connections. In general, network 180 can be any combination of connections and protocols known in the art that will support communications between client device 105, query processing server 120, and/or resources 170A-170N via their respective network interfaces in accordance with embodiments of the present invention.

Figure 2:
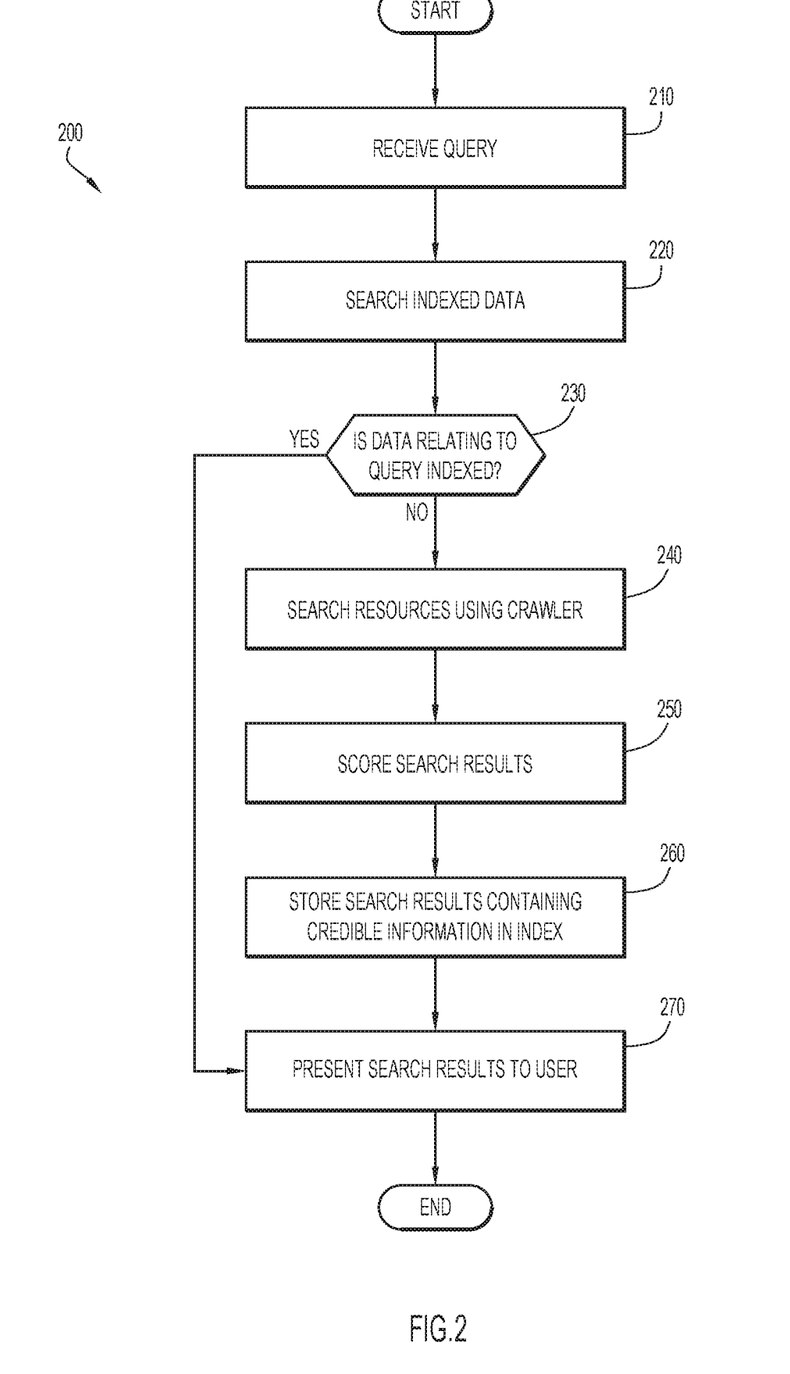
FIG. 2 is a flow chart depicting a method of query processing in accordance with an embodiment of the present invention.

FIG. 2 is a flow chart depicting a method 200 of query processing in accordance with an embodiment of the present invention.

A query is received at operation 210. Query processing server 120 may receive a query that has been provided by a user of client device 105. The query may include any word, phrase, or other string that the user has provided to describe a particular subject of interest to the user. Initially, a query received by query processing module 120 is processed by query processing module 135.

Indexed data is searched using the query at operation 220. An index that maps queries to corresponding search results is searched by query processing module 135 to determine whether the index contains search results corresponding to the received query. In some embodiments, query processing module 135 applies various pre-processing operations to a received query, such as correcting any misspelled words or typos, performing lemmatization, removing articles such as "an" or "the," and the like.

Operation 230 determines whether data relating to the query is indexed. If search results for the received query are included in the index, then the search results may be presented to a user of client device 105 at operation 270. However, when query processing module 135 determines that the index does not contain any search results for the received query, query processing module 135 instructs crawler module 140 to search network-accessible resources for search results that are relevant to the query at operation 240.

Crawler module 140 may search one or more resources, such as resources 170A-170N, to identify and retrieve data that relates to the received query. Crawler module 140 may maintain a list of discovered resources that are searched, which may include search engines, trade journals, academic journals, news websites, wikis, blogs, review websites, social media platforms, and any other network-accessible sources of information. During the process of searching resources, crawler module 140 may discover additional resources, which are added to the list of resources.

The search results are scored at operation 250. Any search results identified by crawler module 140 as relating to the query are scored by scoring system 145 to determine whether the search results include credible information. Natural language processing module 150 may analyze search results to identify features that indicate whether a given search result contains credible information. In some embodiments, natural language processing module 150 employs a machine learning model that is trained to generate a score for each search result that indicates the likelihood that the search result contains credible information. Additionally or alternatively, emotion analytics module 155 may score search results based on the presence or absence of various emotions or tones that are associated with the credibility of a search result. Similarly, review analysis module 160 may analyze reviews of queried subjects, such as products or services, to determine an overall score for the queried subject based on reviews that are identified as trustworthy. Scoring system 145 may normalize and combine the sub-scores generated by natural language processing module 150, emotion analytics module 155, and/or review analysis module 160 in order to generate an overall score for each search result. Each search result's score may be compared to a predetermined threshold value, and any search result that does not satisfy the threshold is determined to not contain credible information, and is removed from the set of search results.

The search results that contain credible information are stored in the index at operation 260. Any search results whose scores satisfy the threshold value are indexed and mapped to the received query. Thus, the index may be expanded so that future queries can benefit from previous crawling and scoring operations.

The search results are presented to a user at operation 270. The search results may include the data for each result, or may include hyperlinks to network-accessible locations where each result is found. Search results are presented to a user of client device 105, who may review and interact with the results using client module 115. In some embodiments, an audit trail of information is additionally presented to the user to provide an explanation of why each search result was returned and the credibility of each source of information. For example, the score for each search result may be provided, and specific factors that contribute to the search result's credibility may be identified. When there is no identifiable consensus among the search results for a particular query, any majority and/or minority outcomes for the query may instead be returned to the user. In some embodiments, a user may provide feedback via client module 115 to indicate agreement or disagreement with the credibility of a result.

Figure 3:
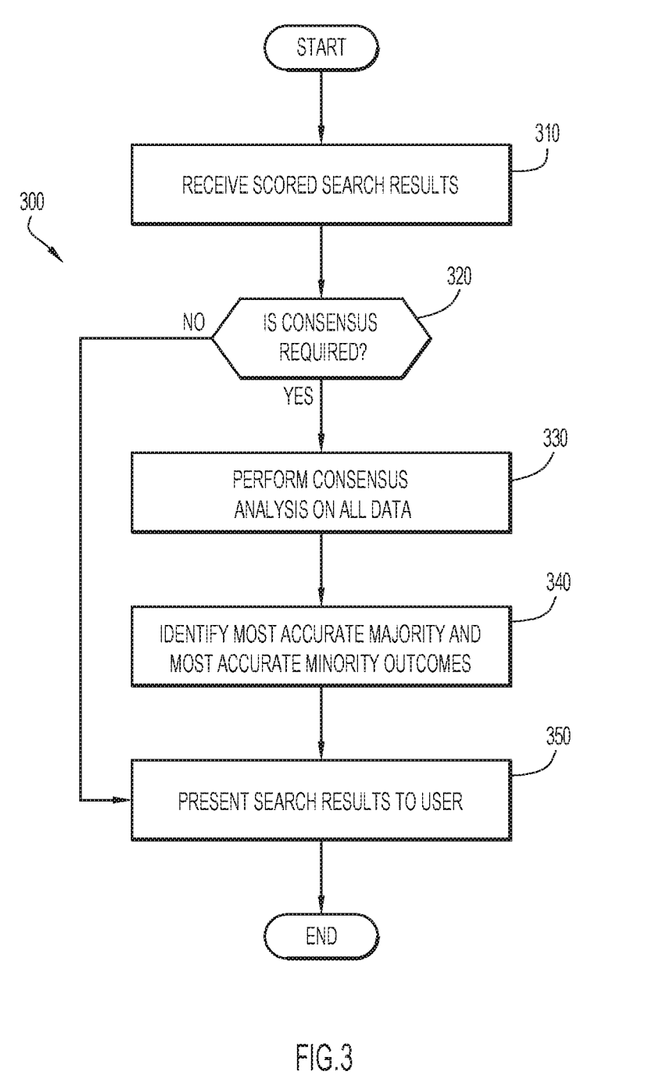
FIG. 3 is a flow chart depicting a method of determining a consensus within search results in accordance with an embodiment of the present invention.

FIG. 3 is a flow chart depicting a method 300 of determining a consensus within search results in accordance with an embodiment of the present invention.

Scored search results are received at operation 310. Scoring system 145 may calculate a score for each search result returned by crawler module 140 for a query. Operation 320 determines whether consensus is required among the search results. Scoring system 145 compares the scores of search results to a threshold value, and if none of the search results have scores that satisfy the threshold, then consensus must be determined among the search results. Alternatively, if two or more search results have scores that satisfy the threshold, but identify contradictory outcomes for a query, then consensus may be required. If consensus is not required, the search results that contain credible information are presented to a user at operation 350.

Consensus analysis is performed on the search results at operation 330. Initially, consensus module 165 may identify outcomes by processing search results using natural language processing to identify subsets of results that arrive at same or similar conclusions. Each search result may be assigned to one of the identified outcomes, and any search results that cannot be assigned to an outcome may be discarded. Weights are applied to the data in each outcome based on factors such as the reputation of the source from which each result is obtained, and whether the source is likely to exhibit bias toward the particular outcome. For example, a review of a product obtained from a manufacturer of the product would not be weighted as heavily as a review by an independent third party. Consensus module 165 may then rank the outcomes based on the scores of the various search results of each outcome with the weights applied to the scores.

The most accurate majority outcome and the most accurate minority outcome are identified at operation 350. Consensus module 165 ranks the outcomes according to the overall outcome scores of each outcome, and may identify the highest-ranked outcome as the most accurate majority outcome, and the next-highest-ranked outcome as the most accurate minority outcome. In some embodiments, consensus module 165 may determine whether the difference between the highest outcome score and the other outcome scores exceeds a threshold difference value. If there is no such outcome, then consensus module 165 may determine that consensus cannot be found among the search results.

The search results are presented to a user at operation 350. The most accurate majority outcome and optionally, the most accurate minority outcome are presented to a user of client device 105 via client module 115. Additionally, an audit trail that outlines the ranking of outcomes may be presented to a user, including any details that explain why weights were applied. If no consensus was identified, then the user may be presented with a notification that consensus could not be determined.

Figure 4:
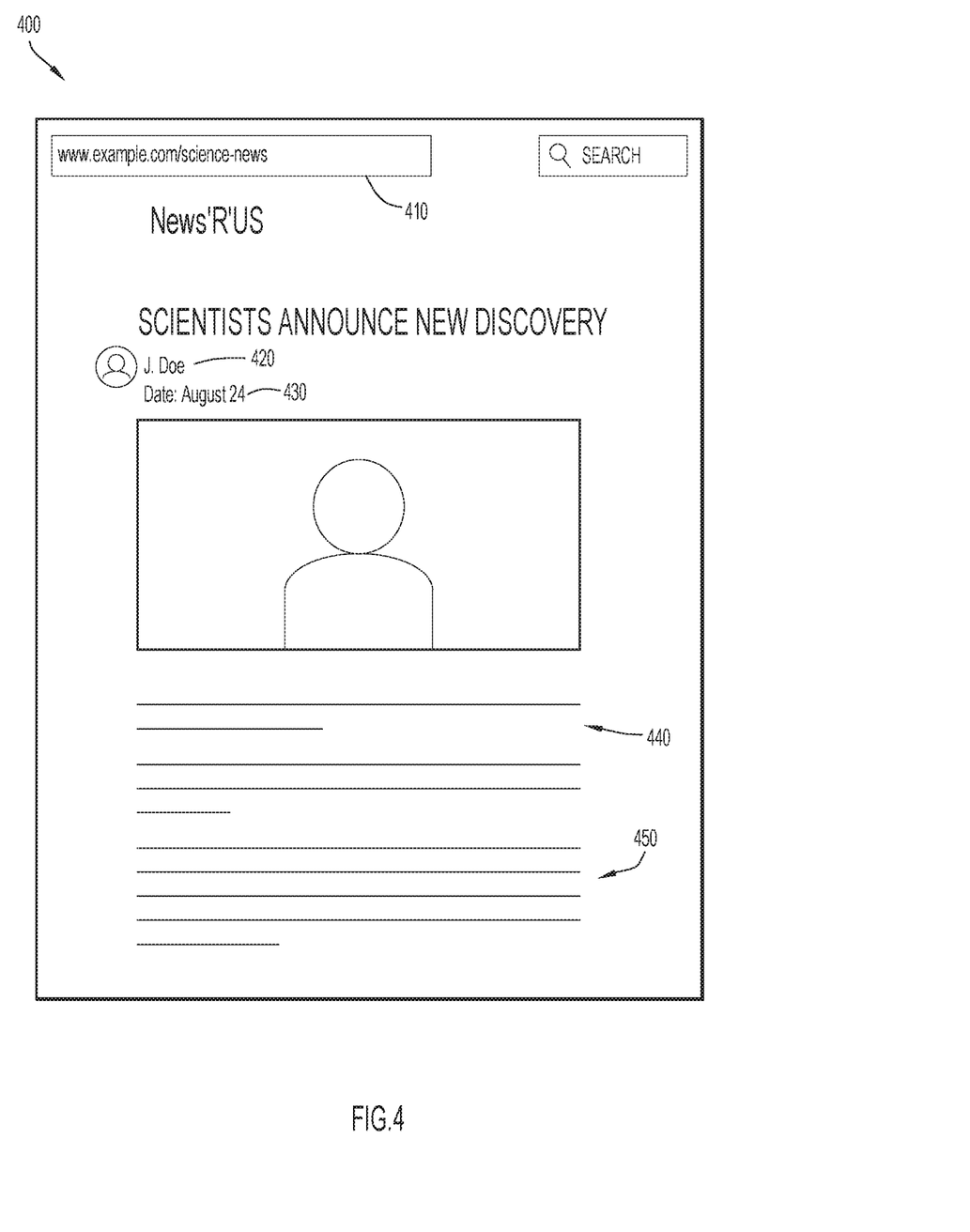
FIG. 4 is a user interface illustration depicting features used to score a search result in accordance with an embodiment of the present invention.

FIG. 4 is a user interface illustration depicting features used to score a search result 400 in accordance with an embodiment of the present invention. As depicted, search result 400 includes a source feature 410, an author feature 420, a publication date feature 430, statement of fact feature 440, and a tone feature 450.

Scoring system 145 may process search result 400 using natural language processing and emotion analytics. For example, source feature 410 may be processed to identify the source of the search result, which may be associated with the presence of credible information. Similarly, author feature 420 may be processed to identify the author of the search result. Publication date feature 430 can be relevant to identifying whether the search result is accurate, as there may be subsequently-published results that include corrections to an earlier publication. Statement of fact feature 440 may be identified using natural language processing. For example, if a scientific publication discusses a finding that is associated with a probability value of less than 0.05, then search result 400 may be scored accordingly as containing credible information. Emotion analytics can also be employed to identify the presence of any emotional language, such as opinionated statements, that might detract from the likelihood of search result 400 including credible information. These features may be evaluated in accordance with present invention embodiments to compute an overall score for search result 400.

Figure 5:
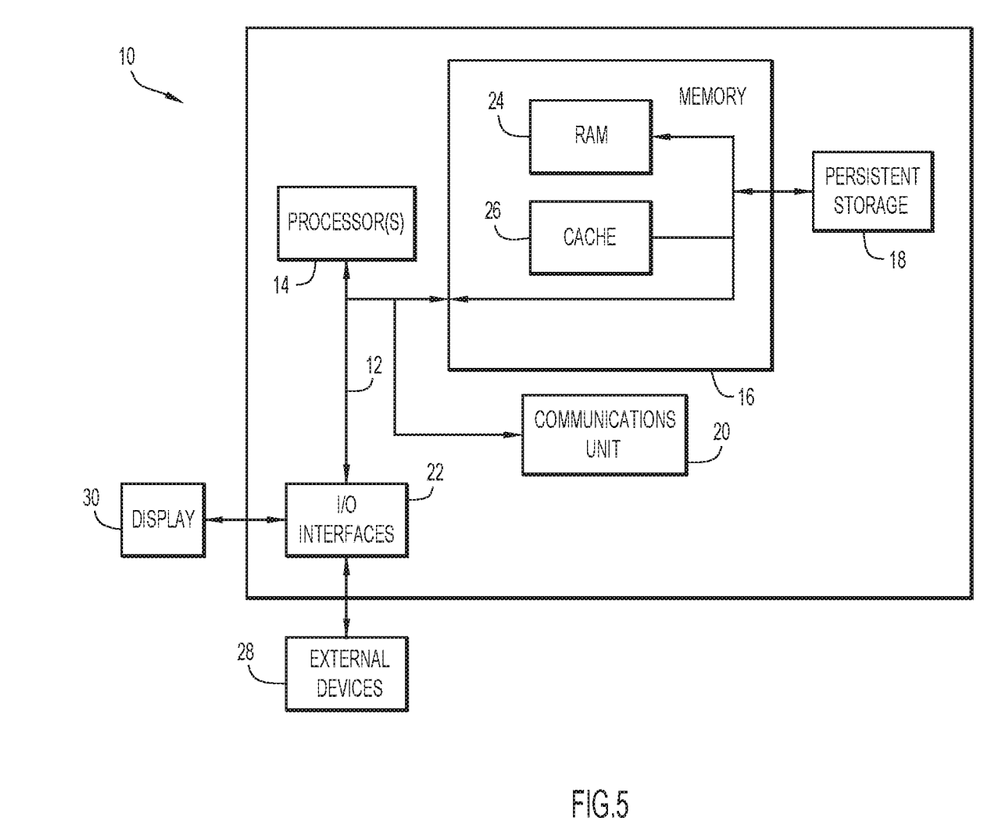
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105, query processing server 120, and/or resources 170A-170N in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to processing a query to retrieve credible search results (e.g., indexed query and search results data, data gathered from network-accessible resources, machine learning model data, training set data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105, query processing server 120, and/or resources 170A-170N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to processing a query to retrieve credible search results (e.g., indexed query and search results data, data gathered from network-accessible resources, machine learning model data, training set data, etc.) may include any information provided to, or generated by, client device 105, query processing server 120, and/or resources 170A-170N. Data relating to processing a query to retrieve credible search results may include any desired format and arrangement, and may include any quantity of any types of fields of any size to store any desired data. The data relating to processing a query to retrieve credible search results may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to processing a query to retrieve credible search results), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of processing a query to retrieve credible search results.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client module 115, query processing module 135, crawler module 140, scoring system 145 (including natural language processing module 150, emotion analytics module 155, and review analysis module 160), consensus module 165, etc.). These systems may include any types of monitors and input devices (e.g., keyboard, mouse, voice recognition, etc.) to enter and/or view information.

It is to be understood that the software (e.g., communications software, server software, client module 115, query processing module 135, crawler module 140, scoring system 145 (including natural language processing module 150, emotion analytics module 155, and review analysis module 160), consensus module 165, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardware, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client module 115, query processing module 135, crawler module 140, scoring system 145 (including natural language processing module 150, emotion analytics module 155, and review analysis module 160), consensus module 165, etc.) may be available on a non-transistory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to processing a query to retrieve credible search results). The database system may be implemented by any number of any conventional or other databases, data stores or storage structures (e.g., files, databases, data structures, data or other repositories, etc.) to store information (e.g., data relating to processing a query to retrieve credible search results). The database system may be included within or coupled to the server and/or client systems. The database systems and/or storage structures may be remote from or local to the computer or other processing systems, and may store any desired data (e.g., data relating to processing a query to retrieve credible search results).

The present invention embodiments may employ any number of any type of user interface (e.g., Graphical User Interface (GUI), command-line, prompt, etc.) for obtaining or providing information (e.g., data relating to processing a query to retrieve credible search results, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, evaluating any data to identify the presence of credible information within the data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of processing a query to retrieve credible search results comprising:
    searching, via a processor, one or more data sources to retrieve search results pertaining to the query;
    performing, via the processor, analytics on the search results to produce a score for the search results, wherein the score indicates credible information within the search results and the analytics include one or more from a group of natural language processing and emotion analytics;
    in response to comparing the score to a threshold to determine that the score indicates a lack of credible information within the search results, analyzing the search results, via the processor, to determine a consensus within the search results, wherein the consensus indicates credible information within the search results, wherein analyzing the search results to determine a consensus comprises analyzing a plurality of outcomes for the query within the search results, ranking the plurality of outcomes based on outcome scores determined based on a subset of the search results associated with each outcome, and selecting a highest-ranked outcome for the consensus; and
    presenting, via the processor, the credible information of the search results.

2. The computer-implemented method of claim 1, wherein the one or more data sources include an index of credible information, and the method further comprises:
    searching the index of credible information to retrieve the search results pertaining to the query.

3. The computer-implemented method of claim 1, wherein analyzing the search results to determine the consensus further comprises:
    weighting the search results based on the analysis of the plurality of outcomes.

4. The computer-implemented method of claim 3, wherein presenting the credible information further comprises:
    presenting information of a majority within the search results based on the consensus, and the weighting associated with the information.

5. The computer-implemented method of claim 4, wherein the one or more data sources include an index of credible information, and the method further comprises:
    storing the information of the majority within the index of credible information.

6. The computer-implemented method of claim 1, wherein the analytics performed to produce a score further include analysis of reviews pertaining to the query.

7. The computer-implemented method of claim 1, wherein presenting the credible information of the search results further includes presenting factors relied upon to determine credibility of the search results.

8. A computer system for processing a query to retrieve credible search results, the computer system comprising:
    one or more computer processors;
    one or more computer readable storage media;
    program instructions stored on the one or more computer readable storage media for execution by at least one of the one or more computer processors, the program instructions comprising instructions to:
    search one or more data sources to retrieve search results pertaining to the query;
    perform analytics on the search results to produce a score for the search results, wherein the score indicates credible information within the search results and the analytics include one or more from a group of natural language processing and emotion analytics;
    in response to comparing the score to a threshold to determine that the score indicates a lack of credible information within the search results, analyze the search results to determine a consensus within the search results, wherein the consensus indicates credible information within the search results, wherein analyzing the search results to determine a consensus comprises analyzing a plurality of outcomes for the query within the search results, ranking the plurality of outcomes based on outcome scores determined based on a subset of the search results associated with each outcome, and selecting a highest-ranked outcome for the consensus; and
    present the credible information of the search results.

9. The computer system of claim 8, wherein the one or more data sources include an index of credible information, and the program instructions further comprise instructions to:

search the index of credible information to retrieve the search results pertaining to the query.

10. The computer system of claim 8, wherein the program instructions to analyze the search results to determine the consensus further comprise instructions to:
weight the search results based on the analysis of the plurality of outcomes.

11. The computer system of claim 10, wherein the program instructions to present the credible information further comprise instructions to:
present information of a majority within the search results based on the consensus, and the weighting associated with the information.

12. The computer system of claim 11, wherein the one or more data sources include an index of credible information, and the program instructions further comprise instructions to:
store the information of the majority within the index of credible information.

13. The computer system of claim 8, wherein the analytics performed to produce a score further include analysis of reviews pertaining to the query.

14. The computer system of claim 8, wherein the program instructions to present the credible information of the search results further comprise instructions to present factors relied upon to determine credibility of the search results.

15. A computer program product for processing a query to retrieve credible search results, the computer program product comprising one or more computer readable storage media collectively having program instructions embodied therewith, the program instructions executable by a computer to cause the computer to:
search one or more data sources to retrieve search results pertaining to the query;
perform analytics on the search results to produce a score for the search results, wherein the score indicates credible information within the search results and the analytics include one or more from a group of natural language processing and emotion analytics;
in response to comparing the score to a threshold to determine that the score indicates a lack of credible information within the search results, analyze the search results to determine a consensus within the search results, wherein the consensus indicates credible information within the search results, wherein analyzing the search results to determine a consensus comprises analyzing a plurality of outcomes for the query within the search results, ranking the plurality of outcomes based on outcome scores determined based on a subset of the search results associated with each outcome, and selecting a highest-ranked outcome for the consensus; and
present the credible information of the search results.

16. The computer program product of claim 15, wherein the one or more data sources include an index of credible information, and the program instructions further cause the computer to:
search the index of credible information to retrieve the search results pertaining to the query.

17. The computer program product of claim 15, wherein the program instructions to analyze the search results to determine the consensus further cause the computer to:
weight the search results based on the analysis of the plurality of outcomes.

18. The computer program product of claim 17, wherein the program instructions to present the credible information further cause the computer to:
present information of a majority within the search results based on the consensus, and the weighting associated with the information.

19. The computer program product of claim 18, wherein the one or more data sources include an index of credible information, and the program instructions further cause the computer to:
store the information of the majority within the index of credible information.

20. The computer program product of claim 15, wherein the analytics performed to produce a score further include analysis of reviews pertaining to the query.

* * * * *